(12) United States Patent
Kono (10) Patent No.: US 11,507,431 B2
(45) Date of Patent: Nov. 22, 2022

(54) RESOURCE ALLOCATION FOR VIRTUAL MACHINES

(71) Applicant: Microsoft Technology Licensing, LLC, Redmond, WA (US)

(72) Inventor: Raymond Noel Nkoulou Kono, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 16/837,688

(22) Filed: Apr. 1, 2020

(65) Prior Publication Data
US 2021/0311802 A1    Oct. 7, 2021

(51) Int. Cl.
G06F 9/455    (2018.01)
G06F 9/50    (2006.01)

(52) U.S. Cl.
CPC ........ *G06F 9/5077* (2013.01); *G06F 9/45558* (2013.01); *G06F 2009/4557* (2013.01); *G06F 2009/45562* (2013.01)

(58) Field of Classification Search
CPC ............... G06F 9/5077; G06F 9/45558; G06F 2009/45562; G06F 2009/4557
See application file for complete search history.

(56) References Cited

U.S. PATENT DOCUMENTS

| | | | |
|---|---|---|---|
| 8,429,449 B2 | 4/2013 | Biran et al. | |
| 8,695,079 B1 * | 4/2014 | Miller | H04L 63/08 726/10 |
| 9,413,683 B2 | 8/2016 | Gulati et al. | |
| 9,450,876 B1 | 9/2016 | Marr | |
| 9,495,215 B2 | 11/2016 | Podvratnik et al. | |
| 9,727,725 B2 * | 8/2017 | Wagner | G06F 9/45533 |
| 2012/0233668 A1 * | 9/2012 | Leafe | G06F 9/00 726/4 |
| 2013/0304923 A1 * | 11/2013 | Clay | G06F 9/45558 709/226 |
| 2015/0058863 A1 | 2/2015 | Karamanolis et al. | |
| 2015/0154048 A1 | 6/2015 | Alshinnawi et al. | |
| 2017/0199769 A1 * | 7/2017 | Jain | G06F 11/008 |
| 2018/0063026 A1 * | 3/2018 | Beveridge | H04L 47/822 |
| 2021/0117220 A1 * | 4/2021 | Zu | G06F 9/45558 |

FOREIGN PATENT DOCUMENTS

| | | |
|---|---|---|
| CN | 108628753 A | 10/2018 |
| CN | 109885377 A | 6/2019 |

OTHER PUBLICATIONS

"International Search Report and Written Opinion Issued in PCT Application No. PCT/US21/017154", dated Jun. 9, 2021, 12 Pages.
(Continued)

*Primary Examiner* — Dong U Kim (57) ABSTRACT

A system and method include reception of a request to create a virtual machine associated with a requested number of resource units of each of a plurality of resource types, determination, for each of the plurality of resource types, of a pool of available resource units, random selection, for each of the plurality of resource types, of the requested number of resource units from the pool of available resource units of the resource type, and allocation of the selected resource units of each of the plurality of resource types to the virtual machine.

20 Claims, 8 Drawing Sheets

(56) References Cited

OTHER PUBLICATIONS

Dufour, Cédric, "How to Ensure Entropy and Proper Random Numbers Generation in Virtual Machines", Retrieved from: https://web.archive.org/web/20191109071903/https:/www.exoscale.com/syslog/random-numbers-generation-in-virtual-machines/, Nov. 9, 2019, 12 Pages.

Mann, et al., "Which is the Best Algorithm for Virtual Machine Placement Optimization?*", in Journal of Concurrency and Computation: Practice and Experience, vol. 29, Issue 10, May 25, 2017, 25 Pages.

\* cited by examiner

RESOURCE ALLOCATION FOR VIRTUAL MACHINES

BACKGROUND

A conventional computer server includes physical resources for computation (e.g., one or more Central Processing Units (CPUs)), data storage (e.g., one or more Random Access Memory (RAM) modules and one or more disk drives), and other server functions. These physical resources, or physical devices, may be allocated to one or more logical servers, or virtual machines, as is known in the art. A virtual machine typically executes an operating system and applications using the physical resources allocated thereto, independent of other physical resources which may be present on the server.

A server executes a virtual machine monitor, or hypervisor, to manage any virtual machines executing therein. The hypervisor loads the operating systems of the virtual machines and allocates CPU resources, RAM, and disk storage space to each virtual machine. Each virtual machine then interacts with the hypervisor to utilize its allocated resources.

Physical resources are typically allocated to virtual machines according to a first-in, first-out protocol. Such a protocol may result in uneven usage of the physical resources of a given resource type. Moreover, conventional resource allocation does not efficiently account for degradation of individual physical resources over time. Improved systems for allocating physical resources to virtual machines are needed.

DETAILED DESCRIPTION

The following description is provided to enable any person in the art to make and use the described embodiments. Various modifications, however, will remain readily-apparent to those in the art.

Some embodiments employ pseudo-random selection of physical resources to be allocated to virtual machines. For example, a request may be received to create a virtual machine including three processor cores in a server including eight processor cores. In response, embodiments may pseudo-randomly select three of eight processor cores for allocation to the virtual machine. Since each of the eight processor cores is associated with a substantially-equal likelihood of being selected, each core may be selected a substantially-equal number of times over the course of operation. In some scenarios, particularly in a case that resource allocation is optimized for each created virtual machine and the lifecycles of each created virtual machine are fairly uniform, each of the eight processor cores experiences a substantially equal amount of wear. As will be described below, embodiments are not limited to processor cores.

The pool of resources from which resources are pseudo-randomly-selected may be determined based on wear. For example, some embodiments may track utilization information associated with each resource. If the utilization information indicates that a resource is near or past the end of the lifetime over which it may be assumed to function reliably, the resource is not included in the pool of resources from which resources are randomly-selected. For example, if one of the eight processor cores of the prior example is deemed unsuitable due to its associated utilization information, the three requested processor cores are randomly-selected from the remaining seven processor cores.

The utilization information may comprise a number and/or an intensity of computations in the case of a processor core resource type and may comprise a number of reads/writes in the case of a disk or RAM resource type. In some embodiments, the utilization information comprises the total uptime of virtual machines to which a particular resource was allocated. Total uptime may be a particularly effective proxy for resource wear in a case that resource allocation is optimized for each created virtual machine. Moreover, existing landscapes for deploying virtual machines may already include mechanisms for monitoring the total uptime metric.

Figure 1:
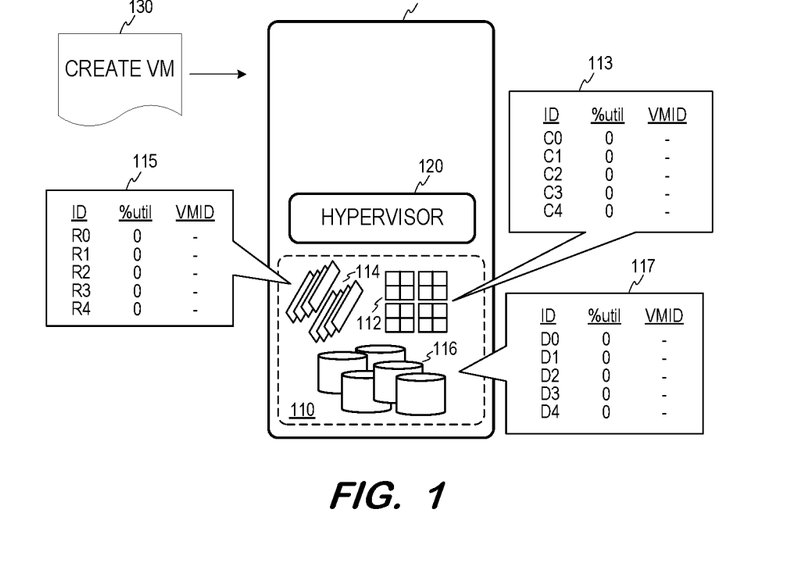
FIG. 1 is a block diagram of a computer server including physical resources and executing a hypervisor according to some embodiments.

FIG. 1 is a block diagram of computer server 100 including physical resources 110 and executing hypervisor 120 according to some embodiments. Embodiments are not limited to computer server 100 or to the foregoing description thereof.

Computer server 100 may comprise any type of server hardware that is or becomes known. The components of computer server 100 may be located within a same physical chassis or multiple independent physical units located local to or remote from one another. Such multiple independent physical units may be "striped" in order to behave as a single logical monolithic unit. Computer server 100 may include other hardware and software required to execute the functions attributed to computer server 100 herein, as well as any other functions to be performed by computer server 100.

Physical resources 110 include processing (i.e., compute) resources 112, RAM storage 114 and disk storage 116. Each of these resources will be referred to herein as a resource type. Embodiments are not limited to the foregoing resource types.

Resources 110 of computer server 100 operate to execute program code of hypervisor 120. As described above, hypervisor 120 may allocate resources 110 to virtual machines executing within computer server 100, instantiate the virtual machines, execute the guest operating system of each virtual machine, and allow the virtual machines to access the resources 110 allocated thereto.

Hypervisor 120 may comprise a native hypervisor or a hosted hypervisor. A native hypervisor runs directly on host system hardware and does not execute on an underlying operating system. A native hypervisor therefore directly accesses the physical resources of the host system. A hosted hypervisor is installed on the underlying operating system of a host system. A hosted hypervisor therefore issues requests to the underlying operating system to access the physical resources of the host system.

Hypervisor 120 allocates subsets of each resource type to each virtual machine created within server 100. The individually-allocatable subsets of each resource type will be referred to herein as resource units. For example, if hypervisor 120 is capable of allocating individual processor cores of processing resources 112 to a virtual machine executing within server 100, each processor core is considered a distinct resource unit. Each dual in-line memory module (DIMM) of RAM resources 114 may be considered a single resource unit, and/or each Gigabyte of storage of RAM resources 114 may be considered a single resource unit, depending on the ability of hypervisor 120, computer server 100 and the RAM design to directly address and allocate these distinct subsets. Fixed disks 116 may similarly consist of resource units defined by distinct drive, platter, sector, or any other suitable subset.

Each resource type of resources 110 is associated with respective metadata 113, 115 and 117. Metadata 113, 115 and 117 may represent only resource units of resources 110 which may be allocated to virtual machines, while other resource units of resources 110 may be specifically earmarked for implementing other operations of computer server 110 (e.g., execution of hypervisor 120).

The metadata of metadata 113, 115 and 117 identifies, for each resource unit of the respective resource type, an identifier of the resource unit, an identifier of a virtual machine to which the resource unit is currently associated, and utilization information. The utilization information may comprise any suitable indicator of a degree of wear, such as but not limited to a total number of executed operations, a percentage of expected lifetime operations utilized, a total usage time, and a percentage of expected lifetime usage elapsed. Computer server 100 may track, update and store metadata 113, 115 and 117, but embodiments are not limited thereto.

FIG. 1 also illustrates reception of request 130 to create a virtual machine. Request 130 may be received from any client or control system, specific examples of which will be discussed below. Request 130 may specify, among other details, a number of resource units to allocate to the virtual machine for each of several resource types. For example, request 130 may comprise an instruction to create a virtual machine to which 2 Gb of RAM, one processor core and 512 Gb of fixed disk space are allocated.

According to some embodiments, hypervisor 120 receives request 130 and instantiates a virtual machine conforming to request 130. In order to do so, hypervisor 120 may first determine a pool of resources for each resource type specified in the request. The example request described above requests resource units of processor core, RAM and fixed disk resource types. The pool of resources for each specified resource type may therefore be determined based on metadata 113, 115 and 117 associated with the resource types.

None of the resource units represented by metadata 113, 115 and 117 of FIG. 1 are assigned to any virtual machines. Also, none of the resource units represented by metadata 113, 115 and 117 are associated with any utilization, or wear. Accordingly, hypervisor 120 may determine that each of these resource unit is available for inclusion in a pool of resource units of its respective resource type.

The requested number of resource units for each of the resource types is then randomly selected from the pool of available resource units of the resource type. It is appreciated that true random behavior may be impossible to achieve in practice and the term random as used herein is intended to encompass pseudo-random selection and any other selection technique which substantially simulates true random behavior.

According to some embodiments, the random selection of resource units for a given resource type includes applying a randomized algorithm to the available pool of resource units for the given resource type to generate a random set of the requested number of resource units. Any suitable system for random selection may be employed in some embodiments.

Figure 2:
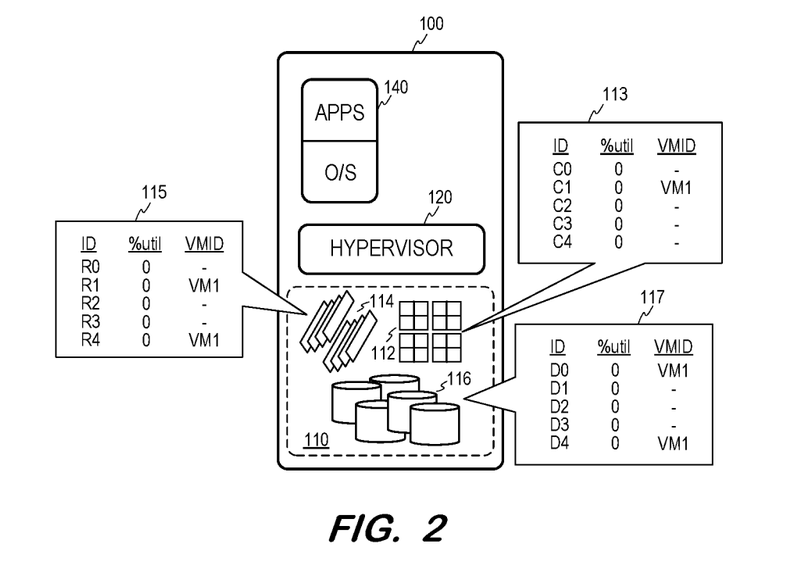
FIG. 2 is a block diagram of a computer server including physical resources and executing a hypervisor and a virtual machine according to some embodiments.

Next, hypervisor 120 allocates the selected resource units of each of the resource types to the virtual machine. FIG. 2 illustrates metadata 113, 115 and 117 after allocation in response to request 130 according to some embodiments. As shown, one processor core C1, two RAM DIMMs R1 and R4 (at 1 Gb each), and two fixed disks D0 and D4 (at 256 Gb each) have been allocated to virtual machine VM1. Hypervisor 120 may then instantiate VM1 140 in accordance with the resource units allocated thereto as is known in the art.

Figure 3:
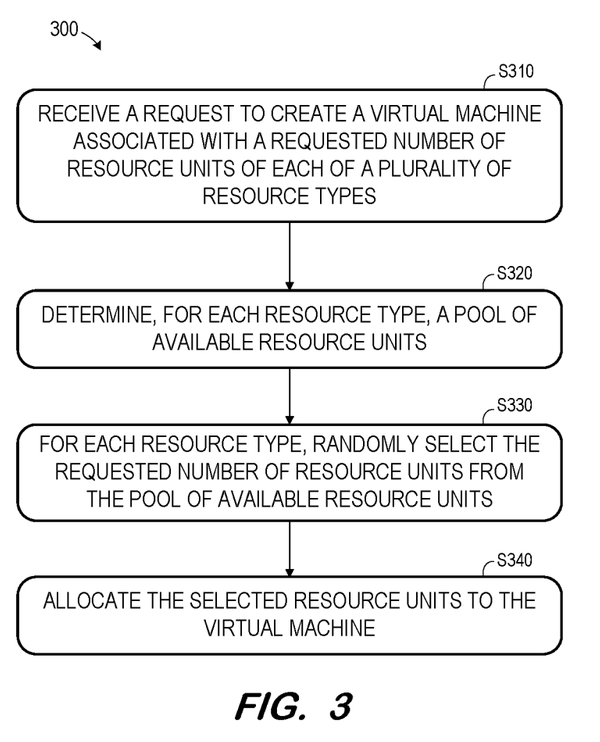
FIG. 3 is a flow diagram of a process to allocate resource units of physical resource types to a virtual machine according to some embodiments.

FIG. 3 comprises a flow diagram of process 300 to allocate resource units of physical resource types to a virtual machine according to some embodiments. In some embodiments, processing units (e.g., one or more processors, processing cores, processor threads) host server execute software program code of a hypervisor to perform process 300. In other embodiments, process 300 is executed by a cloud service provider and/or distributed resource manager. Process 300 and all other processes mentioned herein may be embodied in processor-executable program code read from one or more of non-transitory computer-readable media, such as a volatile or non-volatile random access memory, a fixed disk drive, a DVD-ROM, a Flash drive, and a magnetic tape, and then stored in a compressed, uncompiled and/or encrypted format. Embodiments are therefore not limited to any specific combination of hardware and software.

Initially, at S310, a request to create a virtual machine is received. The requested virtual machine is associated with a requested number of resource units of each of a plurality of resource types. The request may be received from a client system intending to use the virtual machine, from a resource manager for providing virtual machines to one or more client systems, or from any other suitable entity.

A pool of available resource units is determined for each resource type of the request at S320. The pool of available resource units may include all resource units which may be used by virtual machines on the host platform, excluding those resource units which are currently allocated to a virtual machine.

Figure 4:
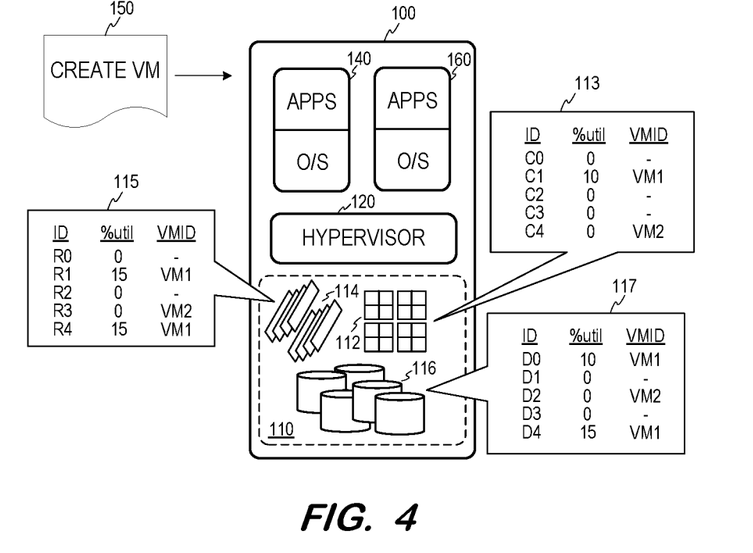
FIG. 4 is a block diagram of a computer server including physical resources and executing a hypervisor and two virtual machines according to some embodiments.

FIG. 4 illustrates an example in which request 150 is received at S310 at server 100 a short time after the depiction of FIG. 2. It is assumed that request 150 requests one resource unit of each resource type of resources 100. At this time, metadata 113, 115 and 117 show the allocations of FIG. 2 and also show utilization information associated with each allocated resource unit. At S320, a pool of resources is determined for each resource type which includes each resource unit that is not currently allocated to a virtual machine (i.e., VM1). In particular, the pool for the processor core resource type includes processor cores C0, C2, C3 and C4, the pool for the RAM storage resource type includes RAM DIMMs R0, R2, R3, and the pool for the fixed disk resource type includes fixed disks D1, D2, D3.

The requested number of resource units for each of the resource types is then randomly selected from the pool of available resource units of the resource type at S330. According to the present example, processor core resource unit C4 is selected from the pool including processor cores C0, C2, C3, the pool for the RAM storage resource unit R3 is selected from the pool including RAM DIMMs R0, R2, R3, and fixed disk resource unit D2 is selected from the pool including fixed disks D1, D2, D3.

Next, and as reflected in the metadata of FIG. 4, the selected resource units of each of the resource types are allocated to the requested virtual machine at S340. FIG. 4 further illustrates instantiation of corresponding VM2 160 in accordance with the resource units allocated thereto.

Figure 5:
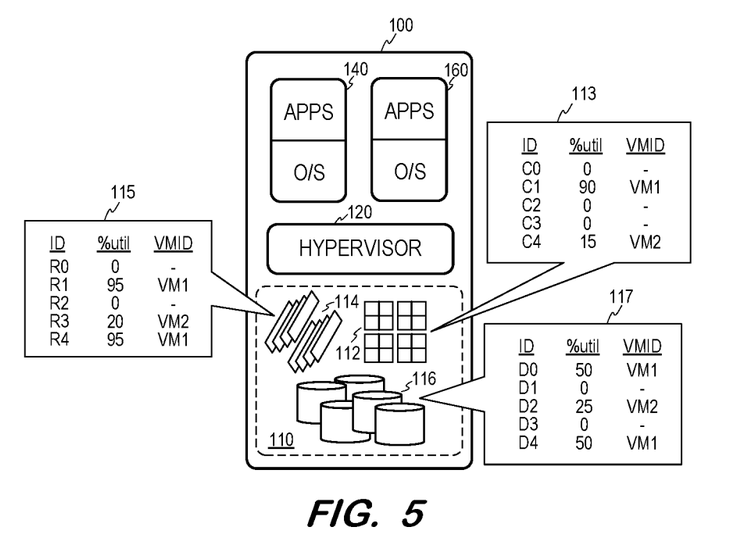
FIG. 5 is a block diagram of a computer server including physical resources and executing a hypervisor and two virtual machines according to some embodiments.

FIG. 5 illustrates server 100 after a period of execution of virtual machines VM1 140 and VM2 160. Metadata 113, 115 and 117 have been updated to reflect utilization of the resource units associated with each virtual machine. Metadata 113, 115 and 117 may be updated based on utilization information collected by hypervisor 120, by an underlying operating system of server 100, and/or by any other monitoring mechanism. As shown, the percentage utilizations (e.g., consumed percent of total recommended operational lifetime) associated with the processor core and RAM resource units of virtual machine VM1 140 are 90% and above, indicating that these resource units may be reaching the end of their recommended life. The utilizations reflected in FIG. 5 are for example purposes only, and would be expected to result from the instantiation, operation and de-allocation of many virtual machines over time, and not only two virtual machines as in the example.

Figure 6:
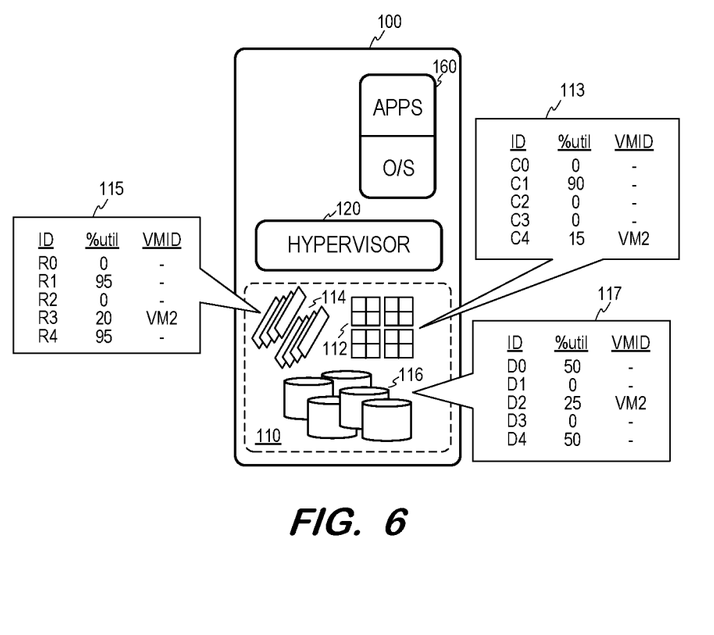
FIG. 6 is a block diagram of a computer server including physical resources and executing a hypervisor and a virtual machine according to some embodiments.

It will now be assumed that hypervisor terminates virtual machine VM1 140, for example, in response to an instruction to terminate VM1 140. FIG. 6 shows server 100 in which VM1 140 is no longer executing. Metadata 113, 115 and 117 of FIG. 6 therefore indicates that no resource units of resources 110 are associated with VM1 140. Accordingly, the resource units formerly associated with VM1 140 may be considered free for allocation to another virtual machine.

Figure 7:
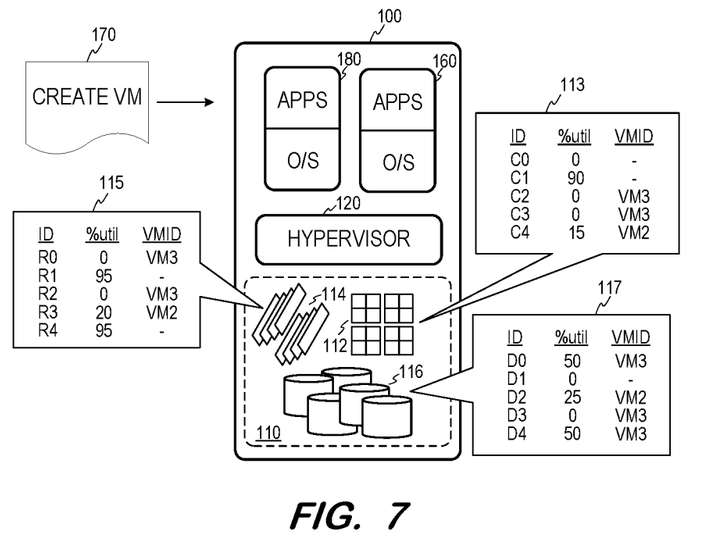
FIG. 7 is a block diagram of a computer server including physical resources and executing a hypervisor and two virtual machines according to some embodiments.

Continuing the present example, FIG. 7 shows server 100 upon receipt of request 170 to create another virtual machine. As described above, hypervisor 120 may respond to request 170 by determining a pool of resources for each requested resource type. The pool for a given resource type may include each resource unit of the resource type that is not currently allocated to a virtual machine and that is associated with a percentage utilization which is less than a threshold value. The threshold value may differ for different resource types and/or in any other suitable manner.

A threshold value of 85% will be assumed for each resource type in the following description. Accordingly, the determined pool for the processor core resource type includes processor cores C0, C2, C3, the pool for the RAM storage resource type includes RAM DIMMs R0, R2, and the pool for the fixed disk resource type includes fixed disks D0, D1, D3, D4.

The requested number of resource units for each of the resource types is then randomly selected from the pool of available resource units of the resource type at S330. According to the present example, processor core resource units C2, C3 are selected from the pool including processor cores C0, C2, C3, RAM storage resource unit R0, R2 are selected from the pool including RAM DIMMS R0, R2, R3, and fixed disk resource units D0, D3, D4 are selected from the pool including fixed disks D0, D1, D3, D4.

Next, and as reflected in the metadata of FIG. 7, the selected resource units of each of the resource types are allocated to the requested virtual machine. FIG. 7 further illustrates instantiation of corresponding VM3 180 in accordance with the resource units allocated thereto.

Figure 8:
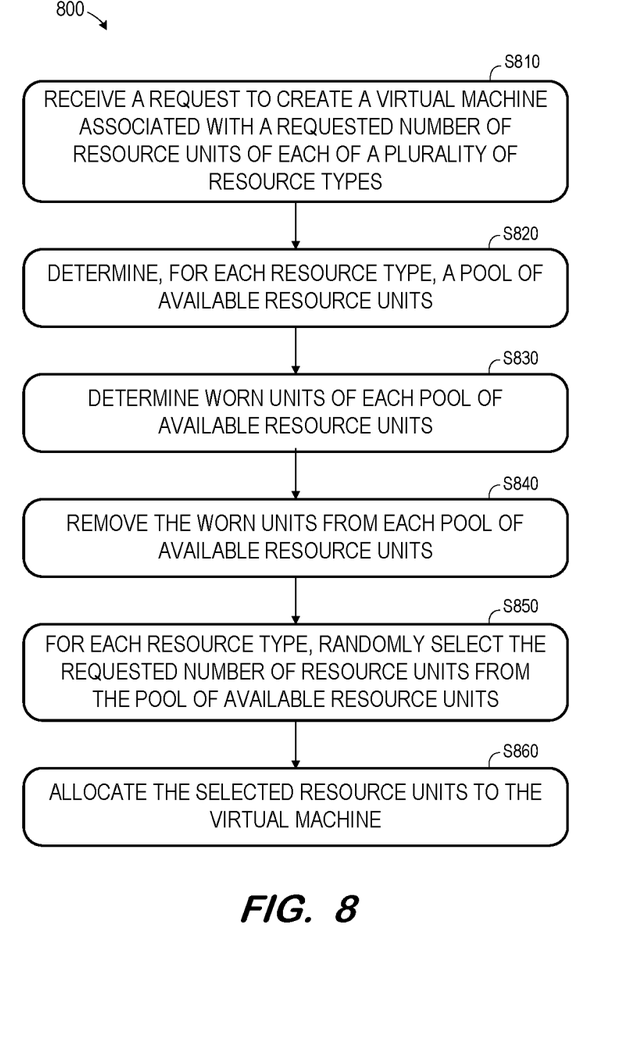
FIG. 8 is a flow diagram of a process to allocate resource units of physical resource types to a virtual machine according to some embodiments.

FIG. 8 comprises a flow diagram of process 800 to allocate resource units of physical resource types to a virtual machine as described with respect to FIG. 7 and according to some embodiments.

A request to create a virtual machine is received at S810 as described above with respect to S310. The requested virtual machine is associated with a requested number of resource units of each of a plurality of resource types. A pool of available resource units is determined for each resource type of the request at S820. The determined pool of available resource units may include all resource units which may be used by virtual machines executing on the host platform, excluding those resource units which are currently allocated to a virtual machine.

At S830, worn resource units are determined from each pool of resource units determined at S820. Worn resource units may be determined based on utilization information associated with each resource unit. The utilization information associated with a resource unit may comprise a number of computations, an intensity of computations, a device temperature, an operational time, a total operation time of virtual machines to which the resource unit was allocated, and/or any other suitable measure. With reference to the FIG. 7 example, resource units C1, R1 and R4 were determined to be worn at S830 and therefore removed, at S840, from their respective pools of available resource units.

The requested number of resource units for each of the resource types is then randomly selected from the pool of available resource units of the resource type at S850. The selected resource units of each of the resource types are allocated to the requested virtual machine at S860. Again referring to FIG. 7, processor core resource units C2, C3, RAM storage resource units R0, R2, and fixed disk resource units D0, D3, D4 are allocated to the requested virtual machine at S860.

Figure 9:
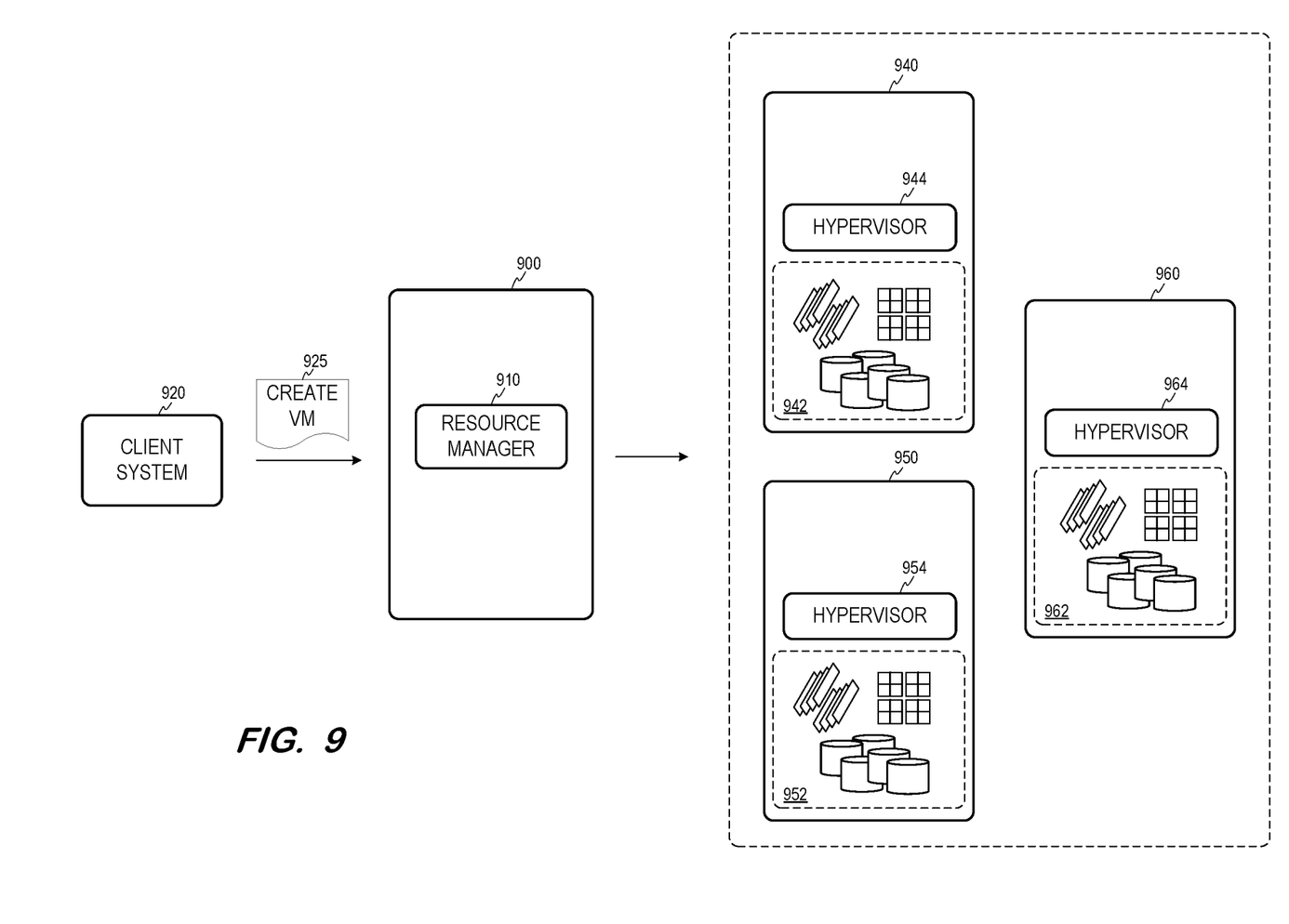
FIG. 9 illustrates an architecture to allocate physical resources of a plurality of computer servers to respective virtual machines according to some embodiments.

FIG. 9 illustrates an architecture in which server 900 executes resource manager 910 to allocate resource units to a virtual machine as described above. Client system 920 transmits request 925 to create a virtual machine to server 900. Client system 920 and server 900 may each comprise any standalone or distributed computing system.

Server 900 may transmit request 925 to host servers 940, 950, 960, which may then execute their respective hypervisors 944, 954, 964 as described above to allocate resource units to a virtual machine and instantiate the virtual machine. A prioritization/load-balancing algorithm may be employed to determine the host server of host servers 940, 950, 960 in which the virtual machine is instantiated.

In some embodiments, resource manager 910 maintains metadata such as metadata 113, 115, 117 associated with each resource unit of resources 942, 952, 962 of host servers 940, 950, 960. Accordingly, resource manager 910 may be executed to identify a host server of host servers 940, 950, 960, to determine a pool of available resource units of the identified host server for each resource type and to randomly select resource units from the pools as described herein. Resource manager 910 may then instruct a hypervisor associated with the identified host servers to allocate the selected resource units to a virtual machine and to instantiate the virtual machine.

Figure 10:
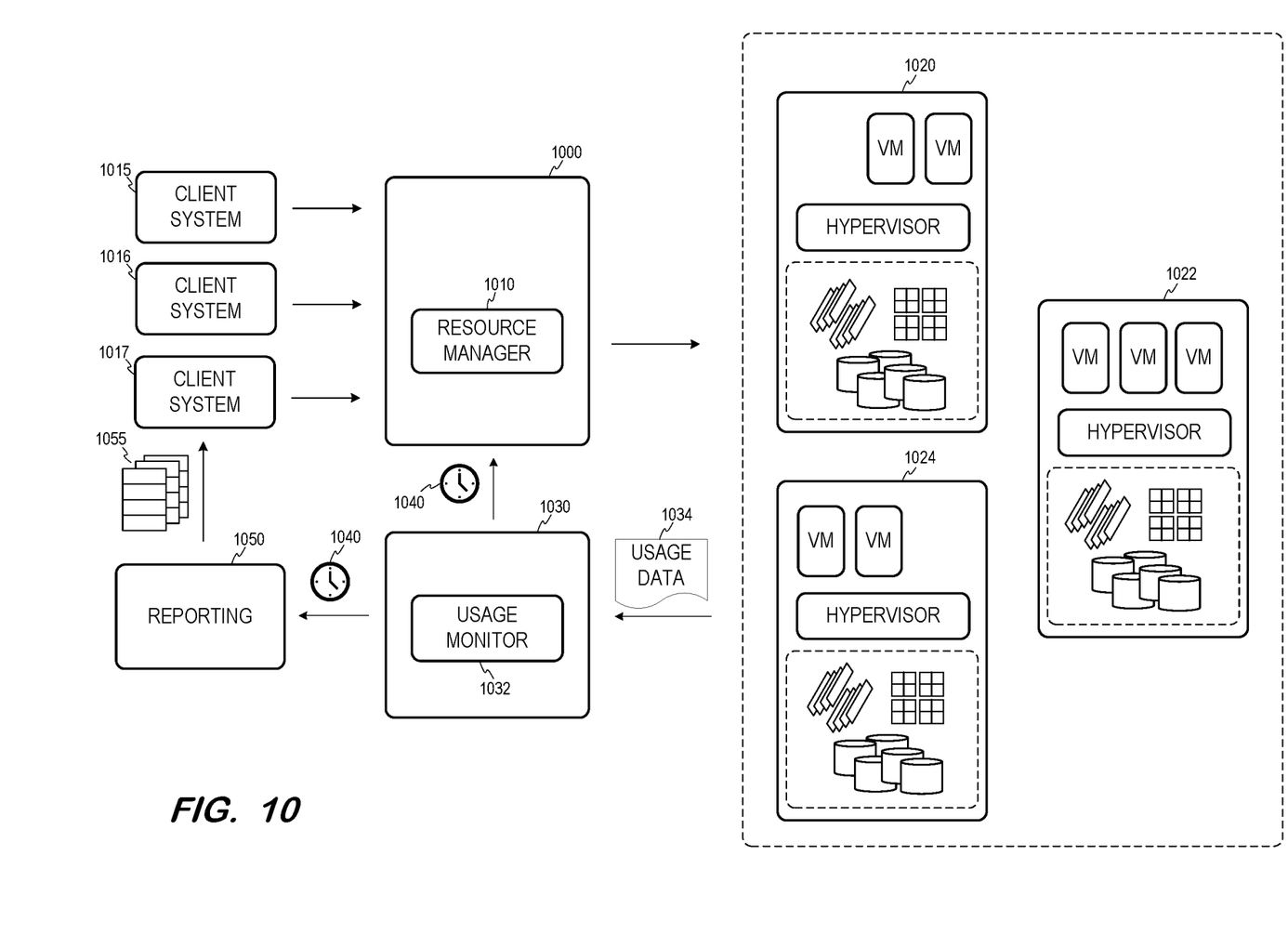
FIG. 10 illustrates a cloud service architecture to allocate physical resources of a plurality of computer servers to respective virtual machines according to some embodiments.

FIG. 10 illustrates an architecture for providing utilization information to a resource manager according to some embodiments. The FIG. 10 architecture may be implemented as a deployment of cloud-based resources. A cloud-based resource is a hosted and manageable item that is available to an external device via the Internet protocol stack. Cloud-based resources may include but are not limited to servers, virtual machines, storage accounts, web apps, databases, virtual networks, software, analytics and intelligence. A customer typically pays only for resources used, which may reduce operating costs while providing scale to cope with increased demand.

Each of client systems 1015, 1016 and 1017 may comprise any system for communicating with resource manager 1010 of server 1000. In some embodiments, each of client systems 1015, 1016 and 1017 may comprise a desktop computing system and may be operated by a customer to access an interface provided by resource manager 1010 to create, update, and delete cloud-based resources. In some embodiments, the customer establishes a subscription with an organization hosting server 1000, and the cloud-based resources managed by the customer are associated with the subscription.

These cloud-based resources may be accessed by the customer, the customer's customers, or any suitable entity. For example, a customer may define compute and storage resources of virtual machines to provide a publicly-accessible online store. In another example, instantiated virtual machines execute the customer's back office functions.

According to some embodiments, resource manager 1010 operates as described above in response to a received request to create a virtual machine. In particular, resource manager 1010 determines a pool of resource units for each resource type from one of servers 1020, 1022, 1024, possibly excluding worn resource units. Resource units satisfying the request are then randomly selected from the respective pools and allocated to a virtual machine, which is then instantiated.

FIG. 10 also illustrates usage server 1030 executing usage monitor 1032. The hosting entity may operate usage monitor 1032 to monitor usage of the virtual machines and/or constituent resource units of servers 1020, 1022, 1024. Usage monitor 1032 may track the total time during which each resource unit and/or virtual machine is being used, as well as a time spent in various states (e.g., turbo state, idle state). Accordingly, usage monitor may transmit total usage time 1040 to resource manager 1010 as shown. Resource manager 1010 may use total usage time 1040 to maintain utilization metadata associated with each resource unit of servers may be used 1020, 1022, 1024

Usage monitor 1032 may also transmit total usage time 1040 to reporting system 1050 of the hosting entity. Generally, reporting system 1050 may operate to generate usage report 1055. Usage report 1055 may comprise a list of resources associated with a given subscription. Report 1055 may also associate each instantiated virtual machine (and any other cloud-based resources of the customer's subscription) with a total usage time and a cost calculated based on the total usage time (e.g., =cost_per_hour×total_usage_time_in_hours).

Figure 11:
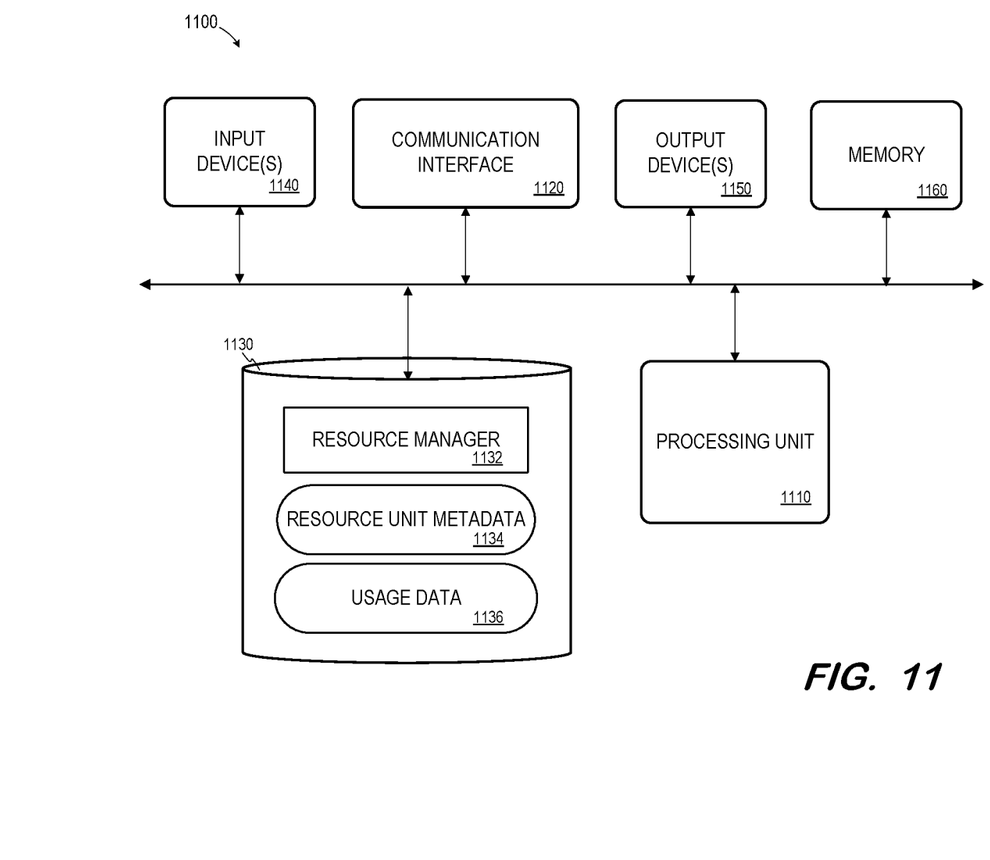
FIG. 11 is a block diagram of a computer server for allocating physical resources of a plurality of computer servers to respective virtual machines according to some embodiments.

FIG. 11 is a block diagram of apparatus 1100 according to some embodiments. Apparatus 1100 may comprise a general-purpose computing apparatus and may execute program code to perform any of the functions described herein. Apparatus 1100 may comprise an implementation of server 1000 in some embodiments. Apparatus 1100 may include other unshown elements according to some embodiments.

Apparatus 1100 includes processing unit 1110 operatively coupled to communication device 1120, data storage device 1130, one or more input devices 1140, one or more output devices 1150 and memory 1160. Communication interface 1120 may facilitate communication with a network and ultimately with client systems as described above. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into apparatus 1100. Output device(s) 1150 may comprise, for example, a display and a speaker.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM), Storage Class Memory (SCM) or any other fast-access memory. Data storage device 1130 may be implemented using distributed storage systems.

Resource manager 1132 may comprise program code executable by processing unit 1110 to cause apparatus 1100 to perform any one or more of the processes described herein. Embodiments are not limited to execution of these processes by a single apparatus. For example, the processes attributed to a resource manager, a hypervisor, a usage monitor and a reporting server herein may be executed by one or more nodes of a distributed computing system.

Resource unit metadata 1134 may associate each resource unit managed by resource manager 1132 with a virtual machine (if any) to which the resource unit is allocated. Usage data 1136 may associate usage information such as usage hours with resource units and be used to determine pools of resource units as described herein. Data storage device 1130 may also store data and other program code for providing additional functionality and/or which are necessary for operation of apparatus 1100, such as device drivers, operating system files, etc.

Each functional component described herein may be implemented in computer hardware (integrated and/or discrete circuit components), in program code and/or in one or more computing systems executing such program code as is known in the art. Such a computing system may include one or more processing units which execute processor-executable program code stored in a memory system.

The above-described diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A system comprising:
a memory storing processor-executable process steps; and
a processing unit to execute the processor-executable process steps to:
receive a request to create a virtual machine associated with a requested number of resource units of each of a plurality of resource types;
determine, for each of the plurality of resource types, a pool of available resource units;
determine, for each of the plurality of resource types, a subset of the pool of available resource units of the resource type based on utilization information indicative of a percentage of remaining expected lifetime operations utilization of each resource unit of the pool of available resource units of the resource type and an earmark indicator of each resource unit provided by metadata;
for each of the plurality of resource types, select the requested number of resource units from the determined subset of the pool of available resource units of the resource type; and
allocate the selected resource units of each of the plurality of resource types to the virtual machine.

2. A system according to claim 1, wherein the utilization information associated with a resource unit of a resource type is further indicative of at least one of total operation time and computation intensity.

3. A system according to claim 1, wherein the pool of available resource units is associated with a first computer server, and the processing unit to execute the processor-executable process steps to:
receive a second request to create a second virtual machine associated with a second requested number of resource units of each of the plurality of resource types;
determine, for each of the plurality of resource types, a second pool of available resource units associated with a second computer server;
determine, for each of the plurality of resource types, a subset of the second pool of available resource units of the resource type based on utilization information indicative of total executed operations of each resource unit of the second pool of available resource units of the resource type;
for each of the plurality of resource types, select the second requested number of resource units from the determined subset of the second pool of available resource units of the resource type; and
allocate the selected second requested number of resource units of each of the plurality of resource types to the second virtual machine,
wherein allocation of the selected resource units of each of the plurality of resource types to the virtual machine comprises transmission of an instruction to a first hypervisor of the first computer server, and
wherein allocation of the selected second requested number of resource units of each of the plurality of resource types to the second virtual machine comprises transmission of a second instruction to a second hypervisor of the second computer server.

4. A system according to claim 3, wherein determination of the subset of the pool of available resource units and the subset of the second pool of available resource units for each of the plurality of resource types is based on at least one of total operation time, and computation intensity.

5. A system according to claim 3, wherein:
the subset of the second pool of available resource units of the resource type comprises a plurality of the available resource units of the resource type; and
the subset of the second pool of available resource units of the resource type exceeds the second requested number of resource units of the resource type for the second virtual machine.

6. A system according to claim 5, wherein the second requested number of resource units from the determined subset of the pool of available resource units of the resource type is selecting randomly.

7. A system according to claim 1, wherein the plurality of resource types includes processing resources, random access memory (RAM), and disk storage.

8. A system according to claim 1, wherein:
the pool of available resource units for the processing resources corresponds to a pool of processor cores;
the pool of available resource units for the RAM corresponds to a pool of dual in-line memory modules (DIMMs); and
the pool of available resource units for the disk storage corresponds to a pool of gigabytes of storage.

9. A system according to claim 1, wherein the percentage of remaining expected lifetime operations utilization of each resource unit of the pool of available resource units of the resource type is compared to a threshold value.

10. A system according to claim 9, wherein, when the percentage of remaining expected lifetime operations utilization is below the threshold value, the respective resource unit of the pool of available resource units is not added to the subset of the pool of available resource units of the resource type.

11. A system according to claim 1, wherein the subset of the pool of available resource units of the resource type comprises a plurality of the available resource units of the resource type.

12. A system according to claim 11, wherein the subset of the pool of available resource units of the resource type exceeds the requested number of resource units of the resource type for the first virtual machine.

13. A system according to claim 12, wherein the requested number of resource units from the determined subset of the pool of available resource units of the resource type is selecting randomly.

14. A computer-implemented method comprising:
receiving a request to create a virtual machine associated with a requested number of resource units of each of a plurality of resource types;
determining, for each of the plurality of resource types, a pool of resource units of a computer server;
for each of the plurality of resource types, determining a subset of the pool of resource units of the resource type based on utilization information indicative of a percentage of remaining expected lifetime operations utilization of each resource unit of the pool of resource units of the resource type and an earmark indicator of each resource unit provided by metadata;

for each of the plurality of resource types, selecting the requested number of resource units from the determined subset of the pool of resource units of the resource type; and instantiating a virtual machine on the computer server based on the selected resource units of each of the plurality of resource types.

15. A method according to claim 14, wherein the utilization information associated with a resource unit of a resource type is further indicative of at least one of total operation time and computation intensity.

16. A method according to claim 14, further comprising:
receiving a second request to create a second virtual machine associated with a second requested number of resource units of each of the plurality of resource types;
determine, for each of the plurality of resource types, a second pool of resource units of a second computer server;
for each of the plurality of resource types, determining a subset of the second pool of resource units of the resource type based on utilization information indicative of total executed operations of each resource unit of the second pool of resource units of the resource type;
for each of the plurality of resource types, select the second requested number of resource units from the determined subset of the second pool of resource units of the resource type; and
instantiate a second virtual machine on the second computer server based on the selected second resource units of each of the plurality of resource types,
wherein instantiation of the virtual machine comprises transmission of an instruction to a first hypervisor of the computer server, and
wherein instantiation of the second virtual machine comprises transmission of a second instruction to a second hypervisor of the second computer server.

17. A method according to claim 16, wherein determination of the subset of the pool of resource units and the subset of the second pool of resource units for each of the plurality of resource types is based on at least one of total operation time, and computation intensity.

18. A system comprising:
a plurality of computer servers, each of the plurality of computer servers comprising one or more resource units of each of a plurality of resource types;
a resource manager to:
receive a request to create a virtual machine associated with a requested number of resource units of each of a plurality of resource types;
determine, for each of the plurality of resource types, a pool of available resource units of a first one of the plurality of computer servers;
determine, for each of the plurality of resource types, a subset of the pool of available resource units of the resource type based on utilization information indicative of a percentage of remaining expected lifetime operations utilization of each resource unit of the pool of available resource units of the resource type and an earmark indicator of each resource unit provided by metadata;
for each of the plurality of resource types, randomly select the requested number of resource units from the determined subset of the pool of available resource units of the resource type; and
allocate the selected resource units of each of the plurality of resource types to the virtual machine; and
a usage monitor to:
monitor usage of the virtual machine;
generate usage information based on the monitored usage; and
transmit the usage information to the resource manager.

19. A system according to claim 18, the resource manager further to:
receive a request to create a second virtual machine associated with a second requested number of resource units of each of the plurality of resource types;
determine, for each of the plurality of resource types, a second pool of available resource units of a second one of the plurality of computer servers;
determine, for each of the plurality of resource types, a subset of the second pool of available resource units of the resource type based on utilization information indicative of total executed operations of each resource unit of the second pool of available resource units of the resource type;
for each of the plurality of resource types, select the second requested number of resource units from the subset of the second pool of available resource units of the resource type; and
allocate the selected second requested number of resource units of each of the plurality of resource types to the second virtual machine; and
the usage monitor further to:
monitor usage of the second virtual machine;
generate second usage information based on the monitored usage of the second virtual machine; and
transmit the second usage information to the resource manager.

20. A system according to claim 19, wherein determination of the subset of the pool of available resource units and the subset of the second pool of available resource units for each of the plurality of resource types is based on usage information associated with one or more virtual machines to which the subset of the pool of available resource units and the subset of the second pool of available resource units were previously allocated.

* * * * *